(12) United States Patent
Uetani et al.

(10) Patent No.: US 8,062,387 B2
(45) Date of Patent: Nov. 22, 2011

(54) REACTIVE POLYMER-SUPPORTING POROUS FILM FOR BATTERY SEPARATOR AND USE THEREOF

(75) Inventors: Yoshihiro Uetani, Osaka (JP); Keisuke Kii, Osaka (JP); Shigeru Fujita, Osaka (JP); Satoshi Nishikawa, Osaka (JP); Tatsuya Okuno, Osaka (JP)

(73) Assignees: Nitto Denko Corporation, Osaka (JP); Sunstar Giken Kabushiki Kaisha, Osaka (JP)

( * ) Notice: Subject to any disclaimer, the term of this patent is extended or adjusted under 35 U.S.C. 154(b) by 0 days.

(21) Appl. No.: 13/152,462

(22) Filed: Jun. 3, 2011

(65) Prior Publication Data
US 2011/0232081 A1    Sep. 29, 2011

Related U.S. Application Data

(62) Division of application No. 10/569,417, filed as application No. PCT/JP2004/012334 on Aug. 20, 2004, now abandoned.

(30) Foreign Application Priority Data

Aug. 26, 2003 (JP) ................. 2003-208808
Jul. 21, 2004 (JP) ................. 2004-213380

(51) Int. Cl.
*H01M 10/40* (2006.01)
*H01M 2/16* (2006.01)
(52) U.S. Cl. ..................... 29/623.5; 29/623.1
(58) Field of Classification Search ......... None
See application file for complete search history.

(56) References Cited

U.S. PATENT DOCUMENTS
3,928,288 A    12/1975 Walker
(Continued)

FOREIGN PATENT DOCUMENTS
EP    0 973 223 A1    1/2000
(Continued)

OTHER PUBLICATIONS

International Search Report issued Nov. 30, 2004 in International (PCT) Application No. PCT/JP2004/012334.
(Continued)

*Primary Examiner* — John S Maples
(74) *Attorney, Agent, or Firm* — Wenderoth, Lind & Ponack, LLP

(57) ABSTRACT

A reactive polymer-supporting porous film is provided as a battery separator which comprises a porous substrate film and a partially crosslinked reactive polymer supported on the porous substrate film. The partially crosslinked reactive polymer is obtained by the reaction of a crosslinkable polymer having at least one group selected from the 3-oxetanyl group and epoxy group reactive with a polycarboxylic acid. The reactive polymer-supporting porous film has a separator and electrodes sufficiently bonded to each other and with low inner resistance suitably used for production of battery excellent in high rate performance. Further, provided is a method of producing a battery which comprises placing the electrode/reactive polymer-supporting porous film layered body in a battery container; introducing an electrolytic solution containing a cationic polymerization catalyst into the battery container thereby bonding the porous film and electrodes together.

11 Claims, 1 Drawing Sheet

U.S. PATENT DOCUMENTS

| | | | |
|---|---|---|---|
| 4,309,494 | A | 1/1982 | Stockel |
| 5,739,234 | A | 4/1998 | Kashio et al. |
| 6,148,503 | A | 11/2000 | Delnick et al. |
| 6,316,142 | B1 | 11/2001 | Delnick et al. |
| 6,632,561 | B1 | 10/2003 | Bauer et al. |
| 2001/0023041 | A1 | 9/2001 | Hayase et al. |
| 2003/0064282 | A1 | 4/2003 | Nakagawa et al. |
| 2004/0023120 | A1 | 2/2004 | Nishikubo et al. |
| 2004/0157118 | A1 | 8/2004 | Uetani et al. |
| 2005/0053843 | A1* | 3/2005 | Takahashi .................... 429/329 |

FOREIGN PATENT DOCUMENTS

| | | |
|---|---|---|
| EP | 1 453 122 A2 | 9/2004 |
| JP | 2000-268875 | 9/2000 |
| JP | 2001-250584 | 9/2001 |
| JP | 2001-291504 | 10/2001 |
| JP | 2002-110245 | 4/2002 |
| JP | 2003-055362 | 2/2003 |
| JP | 2003-142158 | 5/2003 |
| JP | 2004-185920 | 7/2004 |
| WO | 99/40645 | 8/1999 |
| WO | 01/75991 | 11/2001 |

OTHER PUBLICATIONS

Machine translation of JP 2002-110245 (2002), (Apr.).

Machine translation of JP 2003-142158 (2003), (May).

* cited by examiner

REACTIVE POLYMER-SUPPORTING POROUS FILM FOR BATTERY SEPARATOR AND USE THEREOF

This is a divisional of application Ser. No. 10/569,417 filed Feb. 23, 2006, which is the National Stage of International Application No. PCT/JP2004/012334, Aug. 20, 2004, now abandoned, which claims priority from Japanese 2004-213380, filed 21 Jul. 2004, and Japanese 2003-208808, filed 26 Aug. 2003.

FIELD OF THE INVENTION

This invention relates to a reactive polymer-supporting porous film for use as a battery separator which comprises a porous substrate film and a partially crosslinked reactive polymer supported thereon, and a method of producing a battery in which electrodes are bonded to the separator using such a reactive polymer-supporting porous film.

PRIOR ART

Recently, a lithium ion secondary battery having a high energy density has been used widely as a power source for compact portable electronic appliances such as a mobile phone, a note-type personal computer and the like. Such a lithium ion secondary battery is produced by laminating or rolling sheet type positive and negative electrodes and, for example, a porous polyolefin film together, placing the laminated or rolled body in a battery container of, for example, a metal can, pouring an electrolytic solution into the battery container, and air-tightly closing and sealing the container.

However, in recent years, it is strongly required to make such compact portable electronic appliances as mentioned above further small and lightweight. Accordingly, it is also required to make a lithium ion secondary battery further thin and lightweight so that a laminate film battery container tends to be employed in place of a conventional metal can type container.

When such a laminate film battery container is used, pressure cannot be applied to the electrode faces so sufficiently as to maintain the electric connection between a separator and electrodes, as compared with a conventional metal can type container. Therefore, there occurs a problem that the distance between the electrodes is partially widened with the lapse of time because of expansion or shrinkage of electrode active material at the time of charging or discharging of battery, resulting in increase of inner resistance of battery and hence deterioration of battery performance. In addition, the inner resistance of battery becomes uneven, also resulting in deterioration of battery performance.

Further, in the case of producing a sheet-type battery with a large surface area, the distance between electrodes cannot be kept constant so that sufficiently high battery performance cannot be obtained owing to the unevenness of the inner resistance of the battery.

Accordingly, it has been proposed to bond electrodes to a separator using adhesive resin layers composed of a mixed phase of an electrolytic solution phase, a polymer gel layer containing an electrolytic solution and a polymer solid phase to solve such problems, as described in JP-A No. 10-177865. Also, it has been proposed to produce a battery having electrodes and a separator bonded to each other by applying a binder resin solution containing a poly(vinylidene fluoride) resin as a main component to the separator; laminating the electrodes to the separator and drying the laminated body to form an electrode/separator laminated body; placing the electrode/separator laminated body in a battery container; and then pouring an electrolytic solution into the battery container, as described in JP-A No. 10-189054.

Further, it has been also proposed to obtain a battery having a separator bonded to positive and negative electrodes by bonding the separator impregnated with an electrolytic solution to the electrodes with porous adhesive resin layers and keeping the electrolytic solution in the through holes of the porous adhesive resin layers, as described in JP-A No. 10-172606.

However, according to the above-mentioned methods, since the thickness of the adhesive resin layers must be thick to obtain sufficient adhesion between the separator and the electrodes and the amount of the electrolytic solution in relation to the adhesive resin cannot be made high, the resulting battery has a problem that inner resistance increases and desirable cycle properties and high rate discharge property cannot be obtained.

On the other hand, a variety of methods of producing porous films for use as a separator of a battery have already been known. By way of example, a method has been known in which polyolefin film is produced and is drawn at a high ratio to provide a porous film, as described in JP-A No. 09-012756. However, a battery separator making use of such a highly drawn porous film is considerably shrunk in the high temperature environments just in the case of abnormal temperature increase by inner short circuit of battery, and in some cases, there occurs a problem that the separator does not work as a partitioning wall between the electrodes.

Accordingly, it is regarded to be a very important issue to suppress thermal shrinkage of a battery separator in the high temperature environments in order to improve safety of a battery. In this regard, a method has been proposed in which a ultrahigh molecular weight polyethylene and a plasticizer are melted and kneaded, and extruded out of a die into sheet, followed by extracting and removing the plasticizer from the sheet, to obtain a porous film for use as a battery separator which is suppressed in thermal shrinkage in the high temperature environments, as described in JP-A No. 05-310989. However, on the contrary to the aforesaid methods, the porous film obtained by this method has not been drawn so that a problem arises that it has an insufficient strength.

Furthermore, as described above, when a battery having adhesive resin layers between the separator and the electrodes, in which the separator and the electrodes are bonded to each other, is put under the high temperature environments, the strength of the adhesive resin layers is decreased so that thermal shrinkage of the separator inevitably occurs.

The invention has been accomplished to solve the above-mentioned problems in the production of a battery having electrodes bonded to a separator. Accordingly, it is an object of the invention to provide a reactive polymer-supporting porous film suitable for use as a separator in the producing a battery that has sufficient adhesion between electrodes and a separator, low inner resistance, and high rate performance. It is also an object of the invention to provide a method for producing a battery using such a reactive polymer-supporting porous film.

DISCLOSURE OF THE INVENTION

The invention provides a reactive polymer-supporting porous film for use as a battery separator which comprises a porous substrate film and a partially crosslinked reactive polymer supported thereon, the partially crosslinked reactive polymer being obtained by the reaction of a crosslinkable polymer having at least one reactive group selected from the group consisting of 3-oxetanyl group and epoxy group in the molecule with a polycarboxylic acid.

The invention also provides a method of producing such a reactive polymer-supporting porous film for use as a battery separator which comprises supporting a crosslinkable polymer having at least one reactive group selected from the group consisting of 3-oxetanyl group and epoxy group in the molecule and a polycarboxylic acid on a porous substrate film; reacting a part of the reactive groups with the polycarboxylic acid thereby partially crosslinking the crosslinkable polymer and forming the reactive polymer on the porous substrate film.

The invention further provides a method of producing a battery which comprises obtaining an electrode/reactive polymer-supporting porous film layered body by layering electrodes on such a reactive polymer-supporting porous film as mentioned above; placing the electrode/reactive polymer-supporting porous film layered body in a battery container; introducing an electrolytic solution containing a cationic polymerization catalyst into the battery container so that at least a portion of the reactive polymer is swelled or dissolved in the electrolytic solution at least in the vicinity of the interface of the porous film and the electrodes to cause cationic polymerization of the remaining reactive groups of the reactive polymer and further crosslinking of the reactive polymer thereby gelling at least a portion of the electrolytic solution so that the electrodes are bonded to the porous film.

BEST MODE FOR CARRYING OUT THE INVENTION

Figure 1:
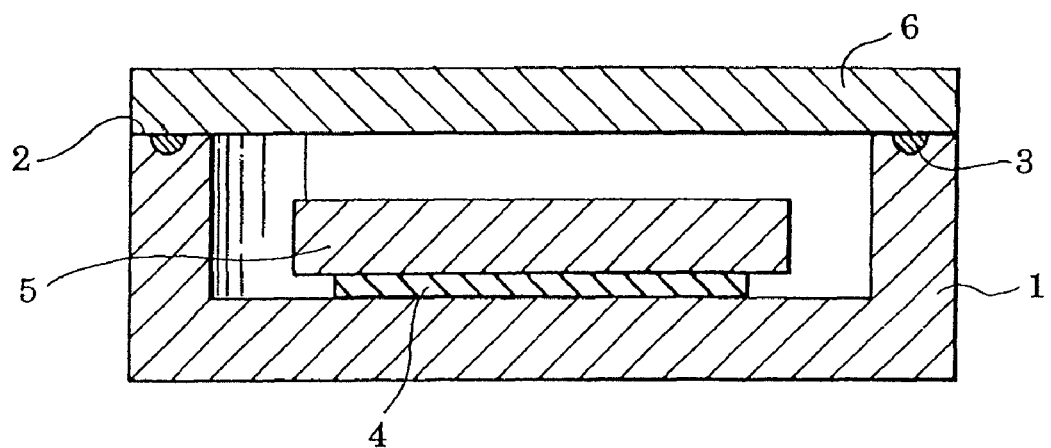
FIG. 1 is a view showing a separator (porous film)/electrode adherent and an apparatus for measuring the area thermal shrinkage in examples.

A reactive polymer-supporting porous film for use as a battery separator of the invention comprises a porous substrate film and a partially crosslinked reactive polymer supported thereon, the partially crosslinked reactive polymer being obtained by the reaction of a crosslinkable polymer having at least one reactive group selected from the group consisting of 3-oxetanyl group and epoxy group in the molecule with a polycarboxylic acid.

The porous substrate film used has a thickness preferably in a range of 3 to 50 µm. When the porous film has a thickness of less than 3 µm, it has an insufficient strength so that when it is used as a separator in a battery, inner short circuit may possibly be caused. On the other hand, when the porous film has a thickness of more than 50 µm, it makes the distance between the electrodes too large in a resulting battery thereby undesirably increasing the inner resistance.

In addition, the porous substrate film used has fine pores having an average pore diameter of 0.01 to 5 µm and a porosity in a range of 20 to 95%, preferably 30 to 90%, and most preferably 35 to 85%. When the porous substrate film has a so small porosity, the resulting battery has decreased ionic conducting channels and thus fails to have sufficient performance if it is used as a separator in a battery. On the other hand, when the porous substrate film has a so large porosity, it has an insufficient strength for use as a separator in a battery. If such a porous substrate film is to have a sufficient strength as a separator, the film used must be thick, which results in undesirable increase of inner resistance of battery, Further, the porous substrate film used has an air permeability preferably of 1500 s/100 cc or less, more preferably 1000 s/100 cc or less. When the porous substrate film used has a too large air permeability, it has a too small ionic conductivity for use as a separator in a battery so that it fails to provide a high performance battery. The porous substrate film used has a piercing strength preferably of 1 N or more. When the porous substrate film having a piercing strength of smaller than 1 N is used as a separator and pressure is applied between the electrodes, it is torn and inner short circuit may take place.

According to the invention, any porous film may be used as the porous substrate film with no particular limitation so long as it has such properties as mentioned above. However, in consideration of solvent resistance and redox resistance, a porous film of polyolefin resin such as polyethylene or polypropylene is preferred. Among the exemplified above, a porous film made of polyethylene is particularly preferred since it melts when being heated and closes the fine pores so that it provides so-called shut down function to a battery. In this connection, the polyethylene may include not only homopolymers of ethylene but also copolymers of ethylene with an α-olefin such as propylene, butane or hexene. Further, a laminate film of a porous film of polytetrafluoroethylene, polyimide and the like with the above-mentioned polyolefin porous film is also excellent in the heat resistance and therefore is used preferably as the porous substrate film.

According to the invention, the crosslinkable polymer refers to a polymer having at least one reactive group selected from the group consisting of 3-oxetanyl group and epoxy group in the molecule. It is preferably a radical copolymer of at least one radical polymerizable monomer selected from the group consisting of a radical polymerizable monomer having 3-oxetanyl group and a radical polymerizable monomer having an epoxy group with another radical polymerizable monomer.

In particular, the crosslinkable polymer is preferably a polymer having 3-oxetanyl and epoxy groups in the molecule, or a polymer having epoxy groups in the molecule. Accordingly, such a crosslinkable polymer can be obtained preferably either by radical copolymerization of a radical polymerizable monomer having 3-oxetanyl group and a radical polymerizable monomer having an epoxy group with another radical polymerizable monomer or by radical copolymerization of a radical polymerizable monomer having epoxy groups with another radical polymerizable monomer.

As already known, either 3-oxetanyl or epoxy group reacts on one hand with carboxyl groups and on the other hand it is cation-polymerizable. Therefore, according to the invention, at first a crosslinkable polymer having at least one reactive group selected from the group consisting of 3-oxetanyl group and epoxy groups in the molecule is reacted with a polycarboxylic acid making use of such reactive groups to obtain a partially crosslinked reactive polymer, and then the crosslinked reactive polymer is supported on the porous substrate film thereby to provide a reactive polymer-supporting porous film for use as a battery separator.

Further, according to the invention, as described hereinafter, electrodes are layered on such a reactive polymer-supporting porous film to provide an electrode/reactive polymer-supporting porous film layered body, and then layered body is immersed in an electrolytic solution containing a cationic polymerization catalyst, preferably an electrolyte working also as a cation polymerization catalyst, so that at least a portion of the crosslinkable polymer that has been partially crosslinked or the resulting reactive polymer on the porous film is swollen or dissolved in the electrolytic solution and then diffused thereinto, followed by being further crosslinked by cationic polymerization of the remaining reactive groups. This causes gelation of the electrolytic solution in the vicinity of the interface of the porous film and the electrodes and consequently, the electrodes and the porous film are bonded together.

When the crosslinkable polymer having at least one reactive group selected from the group consisting of 3-oxetanyl group and epoxy group in the molecule is prepared, a 3-oxetanyl group-containing radical-polymerizable monomer and/or an epoxy group-containing radical-polymerizable monomer is used in terms of total amount of these monomers in an amount of 5 to 50% by weight, preferably 10 to 30% by weight of the total monomers used. Accordingly, when a crosslinkable polymer having 3-oxetanyl group is prepared, the 3-oxetanyl group-containing radical-polymerizable monomer is used in an amount of 5 to 50% by weight, preferably 10 to 30% by weight, of the total monomers used. Similarly, when a crosslinkable polymer having epoxy group is obtained, the epoxy group-containing radical-polymerizable monomer is used in an amount of 5 to 50% by weight, preferably 10 to 30% by weight, of the total monomers used.

On the other hand, when a crosslinkable polymer having both 3-oxetanyl and epoxy groups in the molecule is prepared by radical copolymerization of both of a 3-oxetanyl group-containing radical-polymerizable monomer and an epoxy group-containing radical-polymerizable monomer with another radical-polymerizable monomer, the total amount of the 3-oxetanyl group-containing radical-polymerizable monomer and the epoxy group-containing radical-polymerizable monomer is in a range of 5 to 50% by weight, preferably in a range of 10 to 30% by weight, of the total monomers used. In this case, it is preferred that the epoxy group-containing radical-polymerizable monomer is used in an amount of 90% by weight or less of the total of the 3-oxetanyl group-containing radical-polymerizable monomer and the epoxy group-containing radical-polymerizable monomer.

In the preparation of a 3-oxetanyl group-containing crosslinkable polymer or an epoxy group-containing crosslinkable polymer, when the total amount of the 3-oxetanyl group-containing radical-polymerizable monomer and the epoxy group-containing radical-polymerizable monomer is less than 5% by weight of the total monomers used, the amount of the crosslinkable polymer needed for gelation of the electrolytic solution increases, so that the performance of the resulting battery is adversely affected, as described above. On the other hand, when it exceeds 50% by weight, the formed gel is deteriorated in retention of the electrolytic solution, thereby to lower the adhesion strength between the electrodes and separator in the resulting battery.

According to the invention, a 3-oxetanyl group-containing (meth)acrylate represented by the general formula (I)

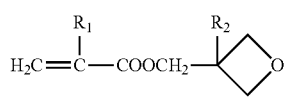

(I)

wherein $R_1$ is a hydrogen atom or a methyl group, and $R_2$ is a hydrogen atom or an alkyl having 1 to 6 carbon atoms, is preferably used as the 3-oxetanyl group-containing radical polymerizable-monomer.

Examples of the 3-oxetanyl group-containing (meth)acrylate include 3-oxetanylmethyl (meth)acrylate, 3-methyl-3-oxetanylmethyl (meth)acrylate, 3-ethyl-3-oxetanylmethyl (meth)acrylate, 3-butyl-3-oxetanylmethyl (meth)acrylate, and 3-hexyl-3-oxetanylmethyl (meth)acrylate. These (meth)acrylates may be used alone or in combination of two or more of these. In the invention, (meth)acrylate means acrylate or methacrylate.

In turn, an epoxy group-containing (meth)acrylate represented by the general formula (II)

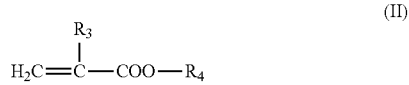

(II)

wherein $R_3$ is a hydrogen atom or a methyl group and $R_4$ is an epoxy group-containing group represented by the following formula (1)

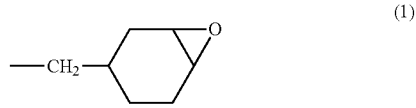

(1)

or (2)

(2)

is preferably used as the epoxy group-containing radical polymerizable monomer.

Examples of the epoxy group-containing (meth)acrylate include 3,4-epoxycyclohexylmethyl (meth)acrylate and glycidyl (meth)acrylate. These (meth)acrylates are used alone or in combination of two or more of these.

The aforesaid another radical polymerizable monomer that is copolymerized with the 3-oxetanyl group-containing radical polymerizable monomer and/or the epoxy group-containing radical polymerizable monomer is preferably at least one selected from the group consisting of (meth)acrylates represented by the general formula (III)

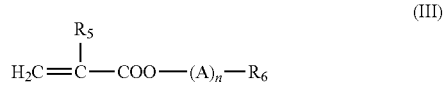

(III)

wherein $R_5$ is a hydrogen atom or a methyl group; A is an oxyalkylene group having 2 or 3 carbon atoms (preferably oxyethylene or oxypropylene group); $R_6$ is an alkyl group having 1 to 6 carbon atoms or a fluoroalkyl group having 1 to 6 carbon atoms; and n is an integer of 0 to 3; and vinyl esters represented by the general formula (IV)

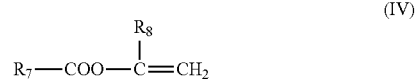

(IV)

wherein $R_7$ is a methyl group or an ethyl group and $R_8$ is a hydrogen atom or a methyl group.

Examples of the (meth)acrylates represented by the general formula (III) include methyl (meth)acrylate, ethyl (meth)acrylate, propyl (meth)acrylate, butyl (meth)acrylate, 2,2,2-trifluoroethyl (meth)acrylate, and 2,2,3,3-tetrafluoropropyl (meth)acrylate.

Other than the exemplified above, the following can be mentioned as the aforesaid another radical polymerizable monomer in which n is an integer of 0 to 3.

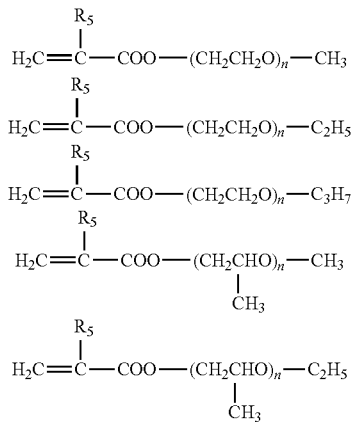

Among the (meth)acrylates represented by the general formula (III), there may be mentioned ethyl acrylate, butyl acrylate, propyl acrylate, isooctyl acrylate, 2-ethylhexyl acrylate and dodecyl acrylate as examples of the said another radical polymerizable monomer which can adjust the glass transition temperature of the resulting reactive polymer to be 70° C. or less as mentioned above.

Examples of the above-mentioned vinyl esters represented by the general formula (IV) include vinyl acetate and vinyl propionate.

As described above, the crosslinkable polymer having at least one reactive group selected from the group consisting of 3-oxetanyl group and epoxy group can be obtained as a radical copolymer preferably by radical copolymerization of at least one radical polymerizable monomer selected from the group consisting of 3-oxetanyl group-containing radical polymerizable monomers and epoxy group-containing radical polymerizable monomers with another radical polymerizable monomer using a radical polymerization initiator. The radical copolymerization may be carried out by any polymerization method such as solution polymerization, bulk polymerization, suspension polymerization or emulsion polymerization. In terms of the easiness of polymerization, adjustment of molecular weight, and post-treatment, solution polymerization or suspension polymerization is preferably employed.

The radical polymerization initiator used is not particularly limited. For example, 2,2'-azobis(isobutyronitrile), dimethyl-2,2'-azobis(2-methylpropionate), benzoyl peroxide or lauroyl peroxide can be used. In the radical copolymerization, if necessary, a molecular weight adjusting agent such as mercaptan may be used.

It is preferred that the crosslinkable polymer has a weight average molecular weight of 10,000 or more. When the weight average molecular weight of the crosslinkable polymer is less than 10,000, a large quantity of the crosslinkable polymer is required for gelation of the electrolytic solution, so that the performance of the battery obtained may be deteriorated. On the other hand, the upper limit of the weight average molecular weight of the crosslinkable polymer is not particularly limited, however it is about 3,000,000 so that it keeps the electrolytic solution in the form of gel and preferably about 2,500,000. It is particularly preferred that the crosslinkable polymer has a weight average molecular weight in a range of 100,000 to 2,000,000.

The above-mentioned crosslinkable polymer having at least one reactive group selected from the group consisting of 3-oxetanyl group and epoxy groups in the molecule are already known, as described in JP-A Nos. 2001-176555 and 2002-110245.

The reactive polymer-supporting porous film for use as a battery separator of the invention comprises a porous substrate film and a reactive polymer supported thereon, the reactive polymer being obtained by reacting the above-mentioned crosslinkable polymer with a polycarboxylic acid so that it is partially crosslinked. The crosslinking of the crosslinkable polymer by the reaction thereof with a polycarboxylic acid is carried out by the reaction of 3-oxetanyl and/or epoxy groups of the crosslinkable polymer with the polycarboxylic acid (i.e., carboxyl groups) as described in JP-A Nos. 11-43540 and 11-116663. According to the invention, the crosslinkable polymer is reacted with the polycarboxylic acid making use of the reactivity of 3-oxetanyl and epoxy groups, thereby partially crosslinking the crosslinkable polymer and obtaining the reactive polymer.

The polycarboxylic acid used in the invention to partially crosslink the crosslinkable polymer is an organic compound having two or more carboxyl groups in the molecule, preferably 2 to 6 carboxyl groups, and more preferably 2 to 4 carboxyl groups.

Examples of dicarboxylic acid having two carboxylic groups in the molecule include straight chain aliphatic saturated dicarboxylic acids having 2 to 20 carbon atoms such as oxalic acid, malonic acid, succinic acid, glutaric acid, adipic acid, pimellic acid, suberic acid, azelaic acid, sebacic acid, undecanedioic acid, dodecanoic acid, tridecanoic acid, tetradecanoic acid, pentadecanoic acid, hexadecanoic acid, octadecanoic acid, nonadecanoic acid and eicosanoic acid; branched aliphatic saturated dicarboxylic acids having 3 to 20 carbon atoms such as methylmalonic acid, ethylmalonic acid, n-propylmalonic acid, n-butylmalonic acid, methylsuccinic acid, ethyl succinic acid, 2,4-diethylglutaric acid and 1,1,3,5-tetramethyloctylsuccinic acid; straight chain or branched aliphatic unsaturated dicarboxylic acids such as maleic acid, fumaric acid, citraconic acid, γ-methylcitraconic acid, mesaconic acid, γ-methylmesaconic acid, itaconic acid and glutaconic acid; hexahydrophthalic acid; hexahydroisophthalic acid; tetrahydrophthalic acids such as hexahydroterephthalic acid, methylhexahydroxyphthalic acid, methylhexaisophthalic acid, methylhexahydroterephthalic acid, cyclohexene-1,2-dicarboxylic acid, cyclohexene-1,6-dicarboxylic acid, cyclohexene-3,4-dicarboxylic acid and cyclohexene-4,5-dicarboxylic acid; tetrahydroisophthalic acids such as cyclohexene-1,3-dicarboxylic acid, cyclohexene-1,5-dicarboxylic acid and cyclohexene-3,5-dicarboxylic acid; tetrahydroterephthalic acids such as cyclohexene-1,4-dicarboxylic acid and cyclohexene-3,6-dicarboxylic acid; dihydrophthalic acids such as 1,3-cyclohexathene-1,2-dicarboxylic acid, 1,3-cyclohexadiene-1,6-dicarboxylic acid, 1,3-cyclohexadiene-2,3-dicarboxylic acid, 1,3-cyclohexadiene-5,6-dicarboxylic acid, 1,4-cyclohexadiene-1,2-dicarboxylic acid and 1,4-cyclohexadiene-1,6-dicarboxylic acid; dihydroisophthalic acids such as 1,3-cyclohexadiene-1,3-dicarboxylic acid and 1,3-cyclohexadiene-3,5-dicarboxylic acid; dihydroterephthalic acids such as 1,3-cyclohexadiene-1,4-dicarboxylic acid, 1,3-cyclohexadiene-2,5-dicarboxylic acid, 1,4-cyclohexadiene-1,4-dicarboxylic acid and 1,4-cyclohexadiene-3,6-dicarboxylic acid; saturated or unsaturated carboxylic acids such as methyltetrahydrophthalic acid, endomethylenetetrahydrophthalic acid, endocis-bicyclo[2.2.1]hept-5-ene-2,3-dicarboxylic acid, methyl-endocis-bicyclo[2.2.1]hept-5-ene 2,3-dicarboxylic acid; chlorendic acid; phthalic acid; terephthalic acid; isophthalic acid; 3-alkylphthalic acids such as 3-methylphthalic acid, 3-ethylphthalic acid, 3-n-propylphthalic acid, 3-isopropylphthalic acid, 3-n-butylphthalic acid, 3-isobutylphthalic acid, 3-sec-butylphthalic acid and 3-tert-butylphthalic acid; 4-alkylphthalic acids such as 4-methylphthalic acid, 4-ethylphthalic acid, 4-n-propylphthalic acid, 4-isopropylphthalic acid, 4-n-butylphthalic acid, 4-isobutylphthalic acid, 4-sec-butylphthalic acid and 4-tert-butylphthalic acid; 2-alkylphthalic acids such as 2-methylisophthalic acid, 2-ethylisophthalic acid, 2-n-propylphthalic acid, 2-isopropylphthalic acid, 2-n-butylphthalic acid, 2-isobutylphthalic acid, 2-sec-butylphthalic acid and 2-tert-butylphthalic acid; 4-alkylisophthalic acids such as 4-methylisophthalic acid, 4-ethylisophthalic acid, 4-n-propylisophthalic acid, 4-isopropylisophthalic acid, 4-n-butylisophthalic acid, 4-isobutylisophthalic acid, 4-sec-butylisophthalic acid, and 4-tert-butylisophthalic acid; 5-alkylisophthalic acids such as 5-methylisophthalic acid, 5-ethylisophthalic acid, 5-n-propylisophthalic acid, 5-isopropylisophthalic acid, 5-n-butylisophthalic acid, 5-isobutylisophthalic acid, 5-sec-butylisophthalic acid and 5-tert-butylisophthalic acid; alkylterephthalic acids such as methylterephthalic acid, ethylterephthalic acid, n-propylterephthalic acid, isopropylterephthalic acid, n-butylterephthalic acid, isobutylterephthalic acid, sec-butylterephthalic acid and tert-butylterephthalic acid; aromatic dicarboxylic acids such as naphthalene-1,2-dicarboxylic acid, naphthalene-1,3-dicarboxylic acid, naphthalene-1,4-dicarboxylic acid, naphthalene-1,5-dicarboxylic acid, naphthalene-1,6-dicarboxylic acid, naphthalene-1,7-dicarboxylic acid, naphthalene-1,8-dicarboxylic acid, naphthalene-2,3-dicarboxylic acid, naphthalene-2,6-dicarboxylic acid, naphthalene-2,7-dicarboxylic acid, anthracene-1,3-dicarboxylic acid, anthracene-1,4-dicarboxylic acid, anthracene-1,5-dicarboxylic acid, anthracene-1,9-dicarboxylic acid, anthracene-2,3-dicarboxylic acid and anthracene-9,10-dicarboxylic acid; and 2,2'-bis(carboxyphenyl)hexafluoropropane.

Examples of polycarboxylic acids having three or more carboxyl groups in the molecule include aliphatic tricarboxylic acids such as tricarballylic acid, citric acid, isocitric acid, and aconitic acid; aromatic tricarboxylic acids such as hemellitic acid and trimellitic acid; aliphatic tetracarboxylic acids having 4 to 13 carbon atoms such as 1,2,3,4-butanetetracarboxylic acid; alicyclic tetracarboxylic acids such as maleated methylcyclohexenetetracarboxylic acid; aromatic tetracarboxylic acids such as mellophanic acid, prehnitic acid, pyromellitic acid, and benzophenonetetracarboxylic acid; hexahydromellitic acid, benzenepentacarboxylic acid, and mellitic acid.

Polyol esters of the above-mentioned polycarboxylic acids and polyols, preferably diol esters of dicarboxylic acids and diols, preferably (poly)alkylene glycols and polymethylenediols may be used also as the polycarboxylic acid. Ethylene glycol diadipate can be exemplified as the diol esters.

Further, the polycarboxylic acid may be a polymer carboxylic acid having a plurality of carboxyl groups in the molecule. Examples of such polymer carboxylic acids include copolymers of (meth)acrylic acid and (meth)acrylic acid esters.

The reactive polymer-supporting porous film for use as a battery separator of the invention comprises a porous substrate film and a reactive polymer supported thereon, wherein the reactive polymer is formed by reacting the above-mentioned crosslinkable polymer with the above-mentioned polycarboxylic acid so that it is partially crosslinked. A method of supporting the reactive polymer on the porous substrate film is not particularly limited. For example, a crosslinkable polymer is dissolved in an appropriate solvent such as acetone, ethyl acetate or butyl acetate together with a polycarboxylic acid, and then either the resulting solution is applied to a porous substrate film or a porous substrate film is impregnated with the solution by casting or spray coating, followed by drying the film to remove the solvent used therefrom, thereby supporting the reactive polymer on the porous film. Then, the porous substrate film thus supporting the crosslinkable polymer and the polycarboxylic acid is heated to an appropriate temperature to cause the reaction of the crosslinkable polymer with the polycarboxylic acid to partially crosslink the crosslinkable polymer as described above. In this way, the reactive polymer-supporting porous film for use as a battery separator of the invention is obtained.

If necessary, an onium salt may be supported as a catalyst together with the crosslinkable polymer and the polycarboxylic acid on the porous substrate film. As the onium salts, those which are exemplified later may be used.

The means or method of supporting the reactive polymer obtained by partially crosslinking the crosslinkable polymer with the polycarboxylic acid on the porous substrate film is not limited to those as above exemplified. For example, as another method, a solution of the crosslinkable polymer is applied to a porous substrate film, and after the film is dried, a solution of the polycarboxylic acid is applied to the porous substrate film or the porous substrate film is impregnated with the solution, followed by heating the film at an appropriate temperature. As a further method, a crosslinkable polymer is reacted with a polycarboxylic acid in a solvent and is partially crosslinked to provide a reactive polymer, and thereafter a solution containing the reactive polymer is applied to a porous substrate film and the film is dried. As a still further method, a crosslinkable polymer is reacted with a polycarboxylic acid in a solvent and is partially crosslinked to provide a reactive polymer, and thereafter a solution containing the reactive polymer is applied to a release paper, and then the reactive polymer is transferred to a substrate porous film from the release paper.

However, one of the particularly preferred methods according to the invention is as follows. A solution containing both of the crosslinkable polymer and the polycarboxylic acid is applied to release sheet and dried to form a crosslinkable polymer/polycarboxylic acid layer on the release sheet. Thereafter, the release sheet is layered on a porous substrate film and is heated under pressure to transfer the crosslinkable polymer/polycarboxylic acid layer to the porous substrate film. Then, the crosslinkable polymer/polycarboxylic acid layer on the porous film is heated to an appropriate temperature so that a reactive polymer is formed on the porous substrate film.

Particularly, a crosslinkable polymer having a glass transition temperature preferably of 70° C. or less can be obtained by copolymerizing at least one radical polymerizable monomer selected from the group consisting of 3-oxetanyl group-containing radical polymerizable monomers and epoxy group-containing radical polymerizable monomers with a suitably selected another radical polymerizable monomer as mentioned hereinbefore. Therefore, when a crosslinkable polymer/polycarboxylic acid layer is formed on release sheet using such a crosslinkable polymer as described above, the layer can be transferred to a porous substrate film by heating the layer at a temperature of not less than the glass transition temperature of the crosslinkable polymer and of not more than 100° C. under pressure without causing any damage to the porous substrate film. The crosslinkable polymer/polycarboxylic acid layer thus transferred to the porous substrate film is heated at an appropriate temperature to readily form a layer of reactive polymer on the porous substrate film.

When the crosslinkable polymer/polycarboxylic acid layer on the release sheet is transferred to a porous substrate film, it is preferred to adjust the heating temperature at 100° C. or less so as not to cause deformation or melting of the porous substrate film. Accordingly, the glass transition temperature of the crosslinkable polymer is preferably in a range of 20 to 60° C.

As the above-mentioned release sheet, a polypropylene resin sheet is a typical one, however it is not particularly limited and sheets made of polyethylene terephthalate, polyethylene, vinyl chloride, and engineering plastics; paper (particularly, resin-impregnated paper); synthetic paper; and their laminates may be usable. These sheets may be surface-treated in the rear faces with silicone or long chain alkyl type compounds, if necessary.

When the crosslinkable polymer/polycarboxylic acid layer is formed on a porous substrate film by transferring the crosslinkable polymer/polycarboxylic acid layer from a release sheet to a porous substrate film in such a manner as mentioned above, the crosslinkable polymer/polycarboxylic acid layer can be reliably formed on the surface of the porous substrate film since the crosslinkable polymer or the crosslinkable polymer/polycarboxylic acid is prevented from penetrating the fine pores of the porous film, and accordingly without closing the fine pores of porous substrate film, unlike the case of applying a solution of the crosslinkable polymer or a solution of the crosslinkable polymer/polycarboxylic acid to the surface of the porous substrate film.

According to the invention, it is preferred that the reactive polymer obtained by partially crosslinking the crosslinkable polymer has an insoluble matter in a proportion of 1 to 90%, preferably 3 to 75%, and most preferably 10 to 65% based on the weight of reactive polymer. The proportion of insoluble matter means, as described later, the amount of the reactive polymer remaining on the porous substrate film when the porous film supporting the reactive polymer is immersed in a mixture of ethylene carbonate/diethyl carbonate (1/1 ratio by volume) at a room temperature for 2 hours under stirring and further immersed in ethyl methyl carbonate.

Such a reactive polymer having an insoluble matter in a proportion of 1 to 90% can be obtained usually by reacting the crosslinkable polymer with a polycarboxylic acid to partially crosslink the crosslinkable polymer in a manner in which a polycarboxylic acid is used so that the amount of the carboxyl groups of the polycarboxylic acid used is in a range of 0.01 to 1.0 parts by mole, preferably 0.05 to 0.8 parts by mole, and particularly preferably 0.1 to 0.7 parts by mole to one part by mole of the reactive groups of the crosslinkable polymer, and in addition, by appropriately adjusting the conditions under which the crosslinkable polymer and the polycarboxylic acid are reacted under heating. In this manner, a reactive polymer having a desired proportion of insoluble matter can be obtained. However, the method is not particularly limited.

By way of example, a reactive polymer having an insoluble matter in a proportion of 1-90% can be obtained by using a polycarboxylic acid in an amount that the molar ratio of the carboxyl group of the polycarboxylic acid to the reactive groups of the crosslinkable polymer is 0.5-1.0 parts by mole, and heating and reacting the crosslinkable polymer with the polycarboxylic acid at a temperature of 50° C. usually over a period of 10 to 500 hours, preferably over 12 to 250 hours.

When the proportion of insoluble matter in the reactive polymer is less than 1% and electrodes are pressure-adhered to a porous film supporting such a reactive polymer thereon to provide an electrode/porous film layered body and the body is immersed in an electrolytic solution, a large portion of the reactive polymer is dissolved and diffused in the electrolytic solution. Therefore, even if the reactive polymer is cation-polymerized and further crosslinked in the electrolytic solution, effective adhesion between the electrodes and the porous film cannot be obtained, as described later. On the other hand, when the proportion of insoluble matter in the reactive polymer is more than 90% and the resulting electrode/porous film layered body is immersed in an electrolytic solution, the reactive polymer is insufficiently swollen, so that the resulting battery containing such an electrode/porous film layered adherent formed of the reactive polymer has high inner resistance and is adversely affected in the battery performance.

The reactive polymer is obtained by reacting the crosslinkable polymer with the polycarboxylic acid so that it is partially crosslinked to have insoluble matter in such an amount as mentioned above. Thus, the reactive polymer is suppressed from dissolving in an electrolytic solution and diffusing thereinto when it is immersed therein. Therefore, when an electrode/porous film layered body is obtained by supporting such a reactive polymer on the porous film and layering the electrodes thereon, and then it is placed in a battery container, an electrolytic solution containing an electrolyte and a cationic polymerization catalyst is poured into the battery container, only a portion of the reactive polymer of the above-mentioned electrode/porous film layered body is swollen or dissolved in the electrolytic solution in the vicinity of the interface of the porous film and the electrodes. Thus, the reactive polymer is cation-polymerized and further crosslinked by the cationic polymerization catalyst, preferably an electrolyte working also as a cationic polymerization catalyst in the electrolytic solution, making use of the remaining reactive groups which have not been used in the partial crosslinking by the polycarboxylic acid, thereby the electrolytic solution is gelled and the electrodes are firmly and closely bonded to the porous film. In this manner, an electrode/porous film (that is a separator of the battery obtained) layered adherent can be obtained in a resulting battery.

That is, according to the invention, the partially crosslinked reactive polymer has an insoluble matter in the above-mentioned range and accordingly when it is immersed in an electrolytic solution, dissolution or diffusion thereof in the electrolytic solution is prevented or suppressed and the reactive polymer is efficiently used for bonding of the porous film to the electrodes, so that the electrodes and the porous film are stably and more firmly bonded to each other by using a relatively small amount of the reactive polymer.

Further, according to a preferred embodiment of the invention, a reactive polymer-supporting porous film that is readily wetted with an electrolytic solution can be obtained, or that is excellent in wettability with an electrolytic solution. The use of such a reactive polymer-supporting porous film in the production of a battery increases the production efficiency. Herein the invention, the wettability with an electrolytic solution of the reactive polymer-supporting porous film is the degree of the easiness with which the reactive polymer-supporting porous film is wetted or impregnated with an electrolytic solution, as described in detail later.

According to a preferred embodiment of the invention, as described above, when a reactive polymer-carrying porous film is obtained by forming a crosslinkable polymer by radical copolymerization of a 3-oxetanyl group-containing (meth)acrylate and/or an epoxy group-containing (meth)acrylate with another (meth)acrylate; obtaining a reactive polymer by partially crosslinking the crosslinkable polymer; and supporting the reactive polymer on a porous film, the ratio of the acrylate monomer as the above-mentioned (meth)acrylate monomers is increased and the amount of the insoluble matter in the reactive polymer obtained, that is, the crosslinking density of the reactive polymer obtained, is so adjusted that it is not excessively increased, and thereby the reactive polymer-supporting porous film excellent in wettability with the electrolytic solution can be obtained. Therefore, it is believed that when a reactive polymer has not an excess crosslinking density and it has flexible molecular chains, and when as it has a low glass transition temperature, or the mobility of the polymer chains is more significant, and as the affinity to the electrolytic solution used in the production of a battery is higher, the reactive polymer is more readily wetted with an electrolytic solution.

As described above, when the reactive polymer-supporting porous film is readily wetted with an electrolytic solution and when a layered body composed of sheet-like positive and negative electrodes and a separator placed therebetween or a cylindrically rolled body of such a layered body is placed in a battery can and an electrolytic solution is poured into the battery can, the electrolytic solution quickly wet or penetrates the entire body of the separator and spreads in the separator and accordingly, the productivity of the battery production can be heightened. Further, in such a manner, the electrolytic solution spreads in the entire body of the separator and contributes to the bonding of the electrodes and the porous film to firmly bond them together. Therefore, the porous film keeps a small area thermal shrinkage ratio. It is generally 20% or less and preferably 15% or less even if a battery is put under a high temperature condition of 150° C.

As described above, the reactive polymer-supporting porous film of the invention is preferably usable for the production of battery. Hereinafter, a method for production of a battery according to the invention using the reactive polymer-supporting porous film will be described.

Although differing depending on batteries, an electrode to be used, that is a positive electrode or a negative electrode, is generally formed in a sheet-like form by firmly bonding and supporting an active material and a conductive agent if necessary and on a conductive substrate by using a binder resin.

At first, sheet-like electrodes described above are layered on the reactive polymer-supporting porous film, or the layered product is rolled to obtain an electrode/reactive polymer-supporting porous film layered body. The layered body is placed in a battery container such as a metal can or a can made of a laminate film and if necessary, terminals are welded, and then a prescribed amount of an electrolytic solution containing a cationic polymerization catalyst dissolved therein is poured into the battery container and the battery container is air-tightly closed and sealed to give a battery having a separator firmly bonded to electrodes formed in such a manner as follows.

When an electrolytic solution is poured into the battery container, at least a portion of the reactive polymer supported on the reactive polymer-supporting porous film is swollen in the vicinity of the interface of the porous film and the electrodes in the electrolytic solution, or dissolved or diffused in the electrolytic solution, to cause the cationic polymerization and further crosslinking of the reactive polymer. Thus, at least a part of the electrolytic solution is made gel thereby bonding porous film to the electrodes firmly.

As clear from the foregoing, the reactive polymer causes gelation of the electrolytic solution at least in the vicinity of the interface between the porous film and the electrodes when it is crosslinked by cationic polymerization and works so as to bond the electrodes and the porous film.

Although depending on the structure and the supported amount as well as the type and the amount of the cationic polymerization catalyst used, the reactive polymer can be polymerized and crosslinked at a normal temperature, however the cationic polymerization can be promoted by heating. In the case the cationic polymerization is carried out under heating, it is carried out usually at a temperature of 40 to 100° C. for 0.5 to 24 hours in consideration of balance with the heat resistance of the materials composing the battery and the productivity. Further, when a battery is manufactured in such a manner as mentioned above, the resulting content in the battery container may be left standing at a normal temperature for several hours in order to swell the reactive polymer, or dissolve and diffuse the polymer in an amount sufficient to bond the porous film to the electrodes after the electrolytic solution is poured into the battery container, The electrode/reactive polymer-supporting porous film layered body is sufficient if the electrodes are layered on the reactive polymer-supporting porous film. Accordingly, depending on the structure and the form of the battery, the electrode/reactive polymer-supporting porous film layered body may have various layered structures such as a negative electrode/porous film/positive electrode or a negative electrode/porous film/positive electrode/porous film.

The electrolytic solution is a solution comprised of an electrolytic salt dissolved in an appropriate solvent. Examples of the electrolytic salt include salts comprising: cationic components such as hydrogen; alkali metals such as lithium, sodium and potassium; alkaline earth metals such as calcium and strontinum; and tertiary or quaternary ammoniums; and anionic components such as inorganic acids such as hydrochloric acid, nitric acid, phosphoric acid, sulfuric acid, borofluoric acid, hydrofluoric acid, hexafluorophosphoric acid, and perchloric acid and organic acids such as carboxylic acid, organic sulfonic acid, and fluorine-substituted organic sulfonic acid. Among them, an electrolytic salt containing an alkali metal in as a cationic component is preferably used.

Practical examples of the electrolytic salt containing an alkali metal ion as a cationic component are alkali metal perchlorates such as lithium perchlorate, sodium perchlorate, and potassium perchlorate; alkali metal tetrafluoroborates such as lithium tetrafluoroborate, sodium tetrafluoroborate, and potassium tetrafluoroborate; alkali metal hexafluorophosphates such as lithium hexafluorophosphate and potassium hexafluorophosphate; alkali metal trifluoroacetates such as lithium trifluoroacetate; and alkali metal trifluoromethanesulfonates such as lithium trifluoromethanesulfonate.

In particular, when a lithium ion secondary battery is to be obtained according to the invention, lithium hexafluorophosphate, lithium tetrafluoroborate, and lithium perchlorate are used preferably as an electrolytic salt.

The solvent used to dissolve the electrolytic salt may be any solvents if they can dissolve the electrolytic salts. For example, non-aqueous solvents used include cyclic esters such as ethylene carbonate, propylene carbonate, butylene carbonate, and γ-butyrolactone; ethers such as tetrahydrofuran and dimethoxyethane; and chain type esters such as dimethyl carbonate, diethyl carbonate and ethyl methyl carbonate. These solvents may be used alone or in combination of two or more.

Although being suitably determined in accordance with the type and the amount of the solvent used, the amount of the electrolytic salt is adjusted usually to be 1 to 50% by weight in the resulting electrolytic solution.

In the invention, an onium salt is preferably used as a cationic polymerization catalyst. Examples of the onium salt are those comprising cationic components such as ammonium, phosphonium, arsonium, stibonium and iodonium, and anionic components such as tetrafluoroborate, hexafluorophosphate, trifluoromethanesulfonate, and perchlorate.

Among the above-exemplified electrolytic salts, lithium tetrafluoroborate and lithium hexafluorophosphate are preferred since they work themselves as cationic polymerization catalysts as well as the electrolytic salts. In this case, either one of lithium tetrafluoroborate and lithium hexafluorophosphate may be used or both of them may be used in combination.

INDUSTRIAL APPLICABILITY

The reactive polymer-supporting porous film for use as a battery separator of the invention comprises a porous substrate film and a reactive polymer supported thereon, the reactive polymer being obtained by reacting some of reactive groups of a crosslinkable polymer having at least one reactive group selected from the group consisting of 3-oxetanyl groups and epoxy groups with a polycarboxylic acid so that it is partially crosslinked.

Accordingly, electrodes are layered on the reactive polymer-supporting porous film to obtain an electrode/reactive polymer-supporting porous film layered body; the layered body is placed in a battery container; an electrolytic solution containing a cationic polymerization catalyst is poured into the battery container; at least a portion of the reactive polymer is swollen or dissolved at least in the vicinity of the interface of the porous film and the electrodes in the electrolytic solution; the remaining reactive groups of the reactive polymer are cation-polymerized so that it is further crosslinked and at least a portion of the electrolytic solution is gelled, thereby firmly bonding the porous film and the electrodes each other to form an electrode/porous film adherent.

Since the reactive polymer in the reactive polymer-supporting porous film of the invention is previously partially crosslinked, when the electrode/reactive polymer-supporting porous film layered body is immersed in an electrolytic solution, dissolution and diffusion of the reactive polymer from the electrode/reactive polymer-supporting porous film layered body into the electrolytic solution are suppressed while the reactive polymer is swollen in the electrolytic solution. As a result, even a small amount of the reactive polymer can bond the porous film (separator) firmly to the electrodes. The porous film is excellent in the ion permeability and satisfactorily functions as a separator. Further, the reactive polymer is prevented from excess dissolution and diffusion so that it does not cause any adverse effect on the electrolytic solution.

According to a preferred embodiment of the invention, a layer of the crosslinkable polymer can be transferred to and supported on a porous substrate film at a relatively low temperature. Then, the reactive polymer-supporting porous film having the reactive polymer reliably on the surface can be readily obtained by. partially crosslinking the crosslinkable polymer. Further according to the invention, the reactive polymer-supporting porous film is readily wetted with an electrolytic solution so that the use of such a reactive polymer-supporting porous film for production of a battery increases the productivity of the battery.

Consequently, according to the invention, not only an electrode/separator layered adherent in which electrodes and a separator are firmly bonded together can be formed in situ in the course of production of battery, but also a battery having low inner resistance and excellent in high rate performance can be obtained easily at a high productivity.

EXAMPLES

The invention will be explained in more detail below by way of Examples, but the invention is not limited to these Examples at all. The physical properties of porous substrate films and the battery performance are evaluated as described below.

(Thickness of Porous Substrate Film)

The thickness of a porous substrate film was measured by measuring the porous film with a $\frac{1}{10000}$ mm thickness gauge and a scanning electron microscopic photograph with 10,000 magnification of the cross-section of the porous film.

(Porosity of Porous Substrate Film)

The porosity of a porous substrate film was calculated from the weight W (g) per unit surface area S ($cm^2$), the average thickness t (cm) of the porous film and the density d ($g/cm^3$) of the resin forming the porous film according to the following equation:

$$\text{Porosity (\%)} = (1-(W/S/t/d)) \times 100$$

(Air Permeability of Porous Substrate Film)

It is measured according to JIS P 8117.

(Piercing Strength)

The piercing test was carried out by using a compressing tester KES-G5 manufactured by Kato Tech. Co., Ltd. The maximum load was read from the load fluctuation curve obtained by the measurement and represented as the piercing strength. Using a needle with a diameter of 1.0 mm and a curvature diameter of the tip end of 0.5 mm, the test was carried out at a speed of 2 cm/s.

(Proportion of Insoluble Matter in Reactive Polymer)

A reactive polymer-supporting porous film supporting a reactive polymer with a known weight A was weighed to measure the weight B. After the reactive polymer-supporting porous film was immersed in a mixture of ethylene carbonate/diethyl carbonate (1/1 ratio by volume) at a room temperature for 2 hours, the film was immersed in ethyl methyl carbonate and washed and dried. Thereafter, the reactive polymer-supporting porous film treated in such a manner was weighed to measure the weight C. The proportion of insoluble matter in the reactive polymer was calculated according to the following equation:

$$\text{Proportion of insoluble matter (\%)} = ((A-(B-C))/A) \times 100$$

(Wettability of Reactive Polymer-Supporting Porous Film with Electrolytic Solution)

After a reactive polymer-supporting porous film is immersed in an electrolytic solution obtained by dissolving 1.0 mol/L of lithium hexafluorophosphate in a mixture of ethylene carbonate/diethyl carbonate (1/1 ratio by weight) for a prescribed period, it was taken out of the electrolytic solution and immediately sandwiched between two platinum electrodes and subjected to resistance measurement by applying 1 KHz a.c. current. The immersion time was variously changed and the 1 KHz a.c. resistance was measured to find such immersion time for which the resistance becomes the minimum and thus evaluate the wettability with electrolytic solution in terms of time (s).

(Glass Transition Temperature of Crosslinkable Polymer)

The glass transition temperature of a crosslinkable polymer was measured as follows. A solution of the crosslinkable polymer was cast on release paper and dried to obtain a sheet of the polymer with a thickness of 0.2 to 0.5 mm and width of 5 mm. The glass transition temperature of the sheet was measured using DMS 120 manufactured by Seiko Instruments Inc. under the conditions of chuck distance 10 mm and 10 KHz in bending mode. The heating speed was 5° C./rain and the temperature range was in a range of 20 to 200° C. The glass transition temperature was calculated from the peak temperature of tan δ.

(Measurement of Area Thermal Shrinkage Ratio of Separator (Porous Film)/Electrode Layered Adherent)

Each of the positive electrode/porous film/negative electrode layered bodies obtained in production of a reference battery, the respective examples and comparative examples was punched in a prescribed size and was immersed in an electrolytic solution obtained by dissolving 1.0 mol/L of lithium hexafluorophosphate in a mixture of ethylene carbonate/diethyl carbonate (1/1 ratio by weight) to obtain samples.

As shown in FIG. 1, a cylindrical container 1 made of SUS having an O-ring 3 in a circular upper end face 2 of the circumferential wall was prepared. A sample 4 was placed in the bottom of the container and a weight 5 was put on so as to apply a pressure of 9 g/m$^2$ and then a cover 6 was put on the cover to close the container. The container containing the sample in such a manner was placed in an oven at 150° C. for 1 hour and then gradually cooled. The sample was taken out of the container. The separator (porous film) of the sample was peeled from the positive and negative electrodes and the surface area of the peeled film was read by a scanner and compared with the surface area of the porous film before heating to measure the area thermal shrinkage ratio.

Reference Example 1

(Preparation of Electrode Sheet)

85 parts by weight of lithium cobaltate (CELLSEAD C-10, manufactured by Nippon Chemical Industrial Co., Ltd.) as an anode active material, 10 parts by weight of acetylene black (DENKA BLACK, manufactured by Denki Kagaku Kogyo K.K.) as a conduction aid and 5 parts by weight of vinylidene fluoride resin (KF POLYMER L#1120, manufacture by Kureha Chemical Industry Co., Ltd.) as a binder were mixed together. The resulting mixture was then mixed with N-methyl-2-pyrrolidone to prepare a slurry of a solid content of 15% by weight. The slurry was applied in a thickness of 200 μm to a 20 μm-thick aluminum foil (a collector) and the resulting aluminum foil was vacuum dried at 80° C. for 1 hour and at 120° C. for 2 hours and then pressed by a roll press to obtain a positive electrode sheet having an active material layer with a thickness of 100 μm.

80 parts by weight of mesocarbon microbeads (MCMB 6-28, manufactured by Osaka Gas Chemicals Co., Ltd.) as a cathode active material, 10 parts by weight of acetylene black (DENKA BLACK, manufactured by Denki Kagaku Kogyo K.K.) as a conduction aid and 10 parts by weight of vinylidene fluoride resin (KF POLYMER L#1120, manufacture by Kureha Chemical Industry Co., Ltd.) as a binder were mixed together. The resulting mixture was then mixed with N-methyl-2-pyrrolidone to prepare a slurry of a solid content of 15% by weight. The slurry was applied in a thickness of 200 μm to a 20 μm-thick copper foil (a collector) and the resulting copper foil was vacuum dried at 80° C. for 1 hour and at 120° C. for 2 hours and then pressed by a roll press to obtain a negative electrode sheet having an active material layer with a thickness of 100 μm.

(Production of Reference Battery)

The negative electrode sheet obtained in Reference Example 1, a porous film (separator) made of polyethylene having a thickness of 16 μm, a porosity of 40%, an air permeability of 300 s/100 cc and a piercing strength 3.0 N and positive electrode sheet obtained in the Reference Example 1 were layered in this order to obtain a positive electrode/porous film/negative electrode layered body. The layered body was placed in an aluminum laminate package and then an electrolytic solution obtained by dissolving 1.0 mol/L of lithium hexafluorophosphate in a mixed solvent of ethylene carbonate/diethyl carbonate (1/1 ratio by weight) was poured into the package and then the package was sealed to assembly a lithium ion secondary battery. The battery was charged and discharged three times at a rate of 0.1 CmA and then charged at a rate of 0.1 CmA, and thereafter discharged at a rate of 1 CmA to measure the 1 CmA discharge capacity A.

The wettability of the above-mentioned separator in terms of time as measured in such a manner as mentioned hereinbefore was 5 seconds. The area thermal shrinkage ratio of the separator as measured by the aforesaid method was 72%.

(Discharging Performance of Batteries of Examples and Comparative Examples)

Each of the laminate film lithium ion secondary batteries obtained by the following Examples and Comparative Examples was charged and discharged each three times at a rate of 0.1 CmA and then charged at a rate of 0.1 CmA and thereafter discharged at a rate of 1 CmA to measure the 1 CmA discharge capacity B. The battery performance was evaluated on the basis of the percentage (%) of the discharge capacity B to the discharge capacity A of the above-mentioned reference battery.

Production Example 1

(Production of Crosslinkable Polymer A (Composed of 5% by Weight of 3,4-Epoxycyclohexylmethyl Acrylate Monomer Component, 20% by Weight of 3-Oxetanyl Group-Containing Monomer Component and 75% by Weight of Methyl Methacrylate Monomer Component))

60.0 g of methyl methacrylate, 16.0 g of 3-ethyl-3-oxetanylmethyl methacrylate, 4.0 g of 3,4-epoxycyclohexylmethyl acrylate, 226.6 g of ethylene carbonate and 0.15 g 2,2'-azobis (isobutyronitrile) were placed in a 500 mL capacity three-necked flask equipped with a refluxing condenser and stirred and mixed for 30 minutes while nitrogen gas was introduced into the flask. Then the resulting mixture was heated to 70° C. and radical polymerization was carried out over 8 hours at the temperature. The resulting reaction mixture was cooled to 40° C. 226.6 g of diethyl carbonate and 0.15 g of 2,2'-azobis (isobutyronitrile) were added to the reaction mixture and the resulting mixture was again heated to 70° C. to carry out radical polymerization at the temperature for another 8 hours. Then the resulting reaction mixture was cooled to 40° C. to obtain a solution of a polymer in a concentration of 15% by weight in a solvent of ethylene carbonate/diethyl carbonate mixture.

While being stirred by a high speed mixer, 100 g of the polymer solution was poured into 600 mL of methanol to precipitate the polymer. The polymer was separated by filtration and washed several times with methanol, placed in a drying tube, and dried by passing dried nitrogen gas (having a dew point −150° C. or lower) obtained by evaporation of liquefied nitrogen through the tube and then by further drying in vacuo in a desiccator for 6 hours, thereby obtaining a crosslinkable polymer A.

The thus obtained crosslinkable polymer A was found to be white powder and was found to have a weight average molecular weight of 344,400 and a number average molecular weight of 174,500 as measured by GPC (gel permeation chromatography). The crosslinkable polymer A was also found to have a glass transition temperature of 116° C. as measured by DSC (differential scanning calorimetry).

Production Example 2

(Production of Crosslinkable Polymer B (Composed of 25% by Weight of 3,4-Epoxycyclohexylmethyl Acrylate Monomer Component and 75% by Weight of Methyl Methacrylate Monomer Component))

60.0 g of methyl methacrylate, 20.0 g of 3,4-epoxycyclohexylmethyl acrylate, 226.6 g of ethylene carbonate and 0.24 g of 2,2'-azobis(isobutyronitrile) were placed in a 500 mL capacity three-necked flask equipped with a refluxing condenser and stirred and mixed for 30 minutes while nitrogen gas was introduced into the flask. The mixture was heated to 70° C. and radical polymerization was carried out at the temperature over 8 hours. The resulting reaction mixture was cooled to 40° C. 226.6 g of diethyl carbonate and 0.24 g of 2,2'-azobis(isobutyronitrile) were added to the reaction mixture and the resulting mixture was again heated to 70° C. for carrying out radical polymerization at the temperature for another 8 hours. The resulting reaction mixture was cooled to 40° C. thereby to obtain a solution of a polymer in a concentration of 15% by weight in a solvent of ethylene carbonate/diethyl carbonate mixture.

100 g of the polymer solution was treated in the same manner as Production Example 1 to obtain a crosslinkable polymer B. It was white powder and was found to have a weight average molecular weight of 429,100 and a number average molecular weight of 133,600 as measured by GPC and a glass transition temperature of 93° C.

Production Example 3

(Production of Crosslinkable Polymer C (Composed of 5% by Weight of 3,4-Epoxycyclohexylmethyl Acrylate Monomer Component, 20% by Weight of 3-Oxetanyl Group-Containing Monomer Component, 37.5% by Weight of Methyl Methacrylate Monomer Component and 37.5% by Weight of N-Butyl Acrylate Monomer Component))

0.05 g of partially saponified polyvinyl alcohol (having a polymerization degree of 2,000 and a saponification degree of 78 to 87 mole %), 2.0 g of completely saponified polyvinyl alcohol (having a polymerization degree of 2,000 and a saponification degree of 98.5 to 99.4 mole %) and 210.0 g of ion exchanged water were placed in a 500 mL capacity three-necked flask equipped with a refluxing condenser. While nitrogen gas was introduced into the flask, the mixture was heated to 95° C. and, after the above-mentioned polyvinyl alcohols were completely dissolved, the mixture was cooled to about 30° C. Then 30.0 g of methyl methacrylate, 4.0 g of 3,4-epoxy-cyclohexylmethyl acrylate, 16.0 g of 3-ethyl-3-oxetanylmethyl methacrylate, 30.0 g of n-butyl acrylate, 0.4 g of 2,2'-azobis(isobutyronitrile) and 2.5 g of 1.0% by weight solution solution of n-dodecanethiol in diethyl carbonate as a solvent were placed in the flask and stirred and mixed for 30 minutes while nitrogen gas was introduced into the flask. Then the mixture was heated to 70° C. for carrying out radical polymerization for 5 hours.

After the reaction mixture obtained in this way was filtered using a 500 mesh filtration net and washed with water, the filtered product was placed in a 500 mL capacity three-necked flask and mixed with 300 mL of ion exchanged water. The mixture was heated to 95° C. while being stirred and washed with hot water to remove the remaining polyvinyl alcohols. The resulting product was filtered using a 500 mesh filtration net and washed with water and again washed with hot water and water repeatedly. Then the product obtained was washed with methanol to remove the remaining water and then dried in vacuo to obtain a crosslinkable polymer C as white and fine granule. It was found to have a weight average molecular weight of 281,600 and a number average molecular weight of 108,700 as measured by GPC. It was also found to have a glass transition temperature of 43° C. as measured by DSC.

Production Example 4

(Production of Crosslinkable Polymer D (Composed of 5% by Weight of 3,4-Epoxycyclohexylmethyl Acrylate Monomer Component, 20% by Weight of 3-Oxetanyl Group-Containing Monomer Component, 50% by Weight of Methyl Methacrylate Monomer Component and 25% by Weight of N-Butyl Acrylate Monomer Component))

In the same manner as Production Example 3, partially saponified polyvinyl alcohol and completely saponified polyvinyl alcohol were dissolved in ion exchanged water under heating and then cooled to prepare a solution. 40.0 g of methyl methacrylate, 4.0 g of 3,4-epoxycyclohexylmethyl acrylate, 16.0 g of 3-ethyl-3-oxetanylmethyl methacrylate, 20.0 g of n-butyl acrylate, 0.4 g of 2,2'-azobis(isobutyronitrile) and 6.0 g of 1.0% by weight solution of n-dodecanethiol in a solvent of ethylene carbonate were added to the solution. The resulting mixture was stirred and mixed for 30 minutes while nitrogen gas was introduced thereinto. The mixture was then heated to 70° C. and radical polymerization was carried out for 5 hours at the temperature. Thereafter, in the same manner as Production Example 3, the resulting reaction mixture was washed with hot water, water, and methanol in this order, and then dried in vacuo to provide a crosslinkable polymer D as white and fine granule.

It was found to have a weight average molecular weight of 224,200 and a number average molecular weight of 79,800 as measured GPC. It was also found to have a glass transition temperature of 41° C. as measured by DSC.

Production Example 5

(Production of Crosslinkable Polymer E (Composed of 5% by Weight of 3,4-Epoxycyclohexylmethyl Acrylate Monomer Component, 20% by Weight of 3-Oxetanyl Group-Containing Monomer Component, 37.5% by Weight of Methyl Methacrylate Monomer Component and 37.5% by Weight of Ethyl Acrylate Monomer Component))

30.0 g of methyl methacrylate, 4.0 g of 3,4-epoxycyclohexylmethyl acrylate, 16.0 g of 3-ethyl-3-oxetanyl-methyl methacrylate, 30.0 g of ethyl acrylate, 150.0 g of ethyl acetate and 0.15 g of 2,2'-azobis(isobutyronitrile) were placed in a 500 mL capacity three-necked flask equipped with a refluxing condenser and stirred and mixed for 30 minutes while nitrogen gas was introduced into the flask. The mixture was heated to 70° C. to carry out radical polymerization. After one hour, radical polymerization started simultaneously with increase of the viscosity of the reaction mixture and the polymerization was carried out for 8 hours. After the reaction mixture was cooled to about 40° C., 0.15 g of 2,2'-azobis(isobutyronitrile) was added to the reaction mixture, and it was again heated to 70° C. to carry out radical polymerization for another 8 hours. Thereafter, the resulting reaction mixture was cooled to 40° C. and 90 g of ethyl acetate was added thereto and stirred and mixed until the mixture became entirely uniform to obtain an ethyl acetate solution of crosslinkable polymer E (having a concentration of 33.3% by weight). The crosslinkable polymer E was found having a weight average molecular weight of 70,200 and a number average molecular weight of 35,000 as measured by GPC. The glass transition temperature was found to be 47° C. by DSC.

Example 1

The crosslinkable polymer A was added to ethyl acetate and stirred at room temperature so that it is dissolved therein to obtain a solution of the crosslinkable polymer A in a concentration of 10% by weight. Separately, an ethanol solution of adipic acid in a concentration of 10% by weight was prepared. The solution of adipic acid was gradually dropwise added to the solution of the crosslinkable polymer A while it was stirred to prepare a mixed solution of the crosslinkable polymer A and adipic acid. The molar ratio of the carboxyl groups of adipic acid to the reactive groups of the crosslinkable polymer A was adjusted to be 0.5.

The mixed solution of the crosslinkable polymer A and adipic acid was applied to both surfaces of a porous substrate film made of polyethylene resin (having a thickness of 16 μm, a porosity of 40%, an air permeability of 300 s/100 cc, a piercing strength of 3.0 N) with a wire bar (#7). The film was then heated at 50° C. to evaporate ethyl acetate and ethanol to obtain a crosslinkable polymer-supporting porous film in which each of the surfaces of the porous film supported the crosslinkable polymer in an amount of 2.2 g/m$^2$. The crosslinkable polymer-supporting porous film was then placed in a thermostat at a temperature of 50° C. for 48 hours to react the crosslinkable polymer supported on the porous film with adipic acid and partially crosslink the crosslinkable polymer thereby providing a reactive polymer-supporting porous film. The proportion of insoluble matter in the reactive polymer in the reactive polymer-supporting porous film was found to be 19%. The wettability of the reactive polymer-supporting porous film with the aforesaid electrolytic solution as measured in terms of time (hereinafter simply referred to as wettability) was 10 minute.

The negative electrode sheet obtained in the Reference Example 1, the reactive polymer-supporting porous film obtained above and the positive electrode sheet obtained in the Reference Example 1 were layered in this order to obtain a separator/electrode layered body. The layered body was placed in an aluminum laminate package and an electrolytic solution obtained by dissolving 1.0 mol/L of lithium hexafluorophosphate in a mixture of ethylene carbonate/diethyl carbonate (1/1 ratio by weight) was poured into the package and then the package was sealed. The package was heated at 70° C. for 7 hours to allow the reactive polymer to carry out cationic polymerization so that it was crosslinked thereby a portion of the electrolytic solution was gelled while the porous film (separator) was bonded to the electrode sheets to provide a laminate battery.

The 1 CmA discharge capacity of the battery was 97% of the discharge capacity of the reference battery. The battery was disassembled and the adhesion strength of the electrode sheets and the separator was measured to find that it was 0.22 N/cm for the positive electrode and 0.10 N/cm for the negative electrode. The surface thermal shrinkage ratio of the separator in the separator/electrode layered adherent obtained by using the above-mentioned reactive polymer-supporting porous film was 2.0%.

Example 2

A reactive polymer-supporting porous film was obtained in the same manner as Example 1, except that the crosslinkable polymer B was used in place of the crosslinkable polymer A. The molar ratio of the carboxyl groups of adipic acid to the reactive groups of the crosslinkable polymer A was adjusted to be 0.5. The proportion of insoluble matter in the reactive polymer in the reactive polymer-supporting porous film was 30%. The wettability of the reactive polymer-supporting porous film was 20 minute.

A laminate battery was obtained in the same manner as Example 1 by using the reactive polymer-supporting porous film obtained above. The 1 CmA discharge capacity of the battery was 93% of the discharge capacity of the reference battery. The battery was disassembled and the adhesion strength of the electrode sheets and the separator was measured to find that it was 0.20 N/cm for the positive electrode and 0.10 N/cm for the negative electrode. The surface thermal shrinkage ratio of the separator in the separator/electrode layered adherent obtained by using the reactive polymer-supporting porous film was 2.5%.

Example 3

A crosslinkable polymer-supporting porous film was obtained in the same manner as Example 1, and a reactive polymer-supporting porous film was obtained in the same manner as Example 1, except that the crosslinkable polymer-supporting porous film was placed in a thermostat at a temperature of 50° C. for 12 hours. The proportion of insoluble matter in the reactive polymer in the reactive polymer-supporting porous film was 3.0%. The wettability of the reactive polymer-supporting porous film was 5 minute.

A laminate battery was obtained in the same manner as Example 1 by using the reactive polymer-supporting porous film obtained above. The 1 CmA discharge capacity of the battery was 90% of the discharge capacity of the reference battery. The battery was disassembled and the adhesion strength of the electrode sheets and the separator was measured to find that it was 0.20 N/cm for the positive electrode and 0.26 N/cm for the negative electrode. The surface thermal shrinkage ratio of the separator in the separator/electrode layered adherent obtained by using the reactive polymer-supporting porous film was 1.5%.

Example 4

A reactive polymer-supporting porous film was obtained in the same manner as Example 1, except that the crosslinkable polymer B was used in place of the crosslinkable polymer A and the molar ratio of the carboxyl groups of adipic acid to the reactive groups of the crosslinkable polymer was adjusted to be 1.0. The proportion of insoluble matter in the reactive polymer in the reactive polymer-supporting porous film was found to be 80%. The wettability of the reactive polymer-supporting porous film was found to be 35 minute.

A laminate battery was obtained in the same manner as Example 1 by using the above-mentioned reactive polymer-supporting porous film. The 1 CmA discharge capacity of the battery was found to be 89% of the discharge capacity of the reference battery. The battery was disassembled and the adhesion strength of the electrode sheets and the separator was measured to find that it was 0.10 N/cm for the positive electrode and 0.05 N/cm for the negative electrode. The surface thermal shrinkage ratio of the separator in the separator/electrode layered adherent obtained by using the above-mentioned reactive polymer-supporting porous film was 5.0%.

Example 5

The crosslinkable polymer C was dissolved in ethyl acetate at room temperature to obtain a solution of the crosslinkable polymer C in a concentration of 10% by weight. Separately, an ethanol solution of adipic acid in a concentration of 5% by weight was prepared. The solution of adipic acid was gradually dropwise added to the above-mentioned solution of crosslinkable polymer C while it was stirred, thereby preparing a mixed solution of the crosslinkable polymer. C and adipic acid. The molar ratio of the carboxyl groups of adipic acid to the reactive groups of the crosslinkable polymer was adjusted to be 0.5.

The mixed solution of the crosslinkable polymer and adipic acid was applied to a release paper by a wire bar (#7) and then heated at 50° C. to evaporate ethyl acetate and ethanol to form a crosslinkable polymer C/adipic acid layer on the release paper. The release paper was laminated on both surfaces of a porous substrate film made of polyethylene (having a thickness of 16 μm, a porosity of 40%, an air permeability of 300 s/100 cc, and a piercing strength of 3.0 N) in such a manner that the crosslinkable polymer C/adipic acid layer on the release paper was brought into contact with the film. The thus obtained laminate was passed through a hot roll at 70° C. and then the release papers were removed from the laminate to provide a crosslinkable polymer-supporting porous film which supported the crosslinkable polymer in an amount of 1.5 g/m² for each surface.

The crosslinkable polymer-supporting porous film was then placed in a thermostat at 50° C. for 48 hours so that the crosslinkable polymer supported on the porous film was reacted with adipic acid and was partially crosslinked to provide a reactive polymer-supporting porous film. The proportion of insoluble matter in the reactive polymer in the reactive polymer-supporting porous film was found to be 59%. The electrolytic solution immersion time of the reactive polymer-supporting porous film was found to be 10 second.

A laminate battery was obtained in the same manner as Example 1 by using the above-mentioned reactive polymer-supporting porous film. The 1 CmA discharge capacity of the battery was found to be 97% of the discharge capacity of the reference battery. The battery was disassembled and the adhesion strength of the electrode sheets and the separator was measured to find that it was 0.15 N/cm for the positive electrode and 0.25 N/cm for the negative electrode. The surface thermal shrinkage ratio of the separator in the separator/electrode layered adherent obtained by using the above-mentioned reactive polymer-supporting porous film was found to be 1.5%.

Example 6

The crosslinkable polymer C was dissolved in ethyl acetate at room temperature to obtain a solution of the crosslinkable polymer C in a concentration of 10% by weight. Separately, an ethanol solution of adipic acid in a concentration of 10% by weight was prepared. The solution of adipic acid was gradually dropwise added to the above-mentioned solution of the crosslinkable polymer C while it was stirred thereby to prepare a mixed solution of the crosslinkable polymer C and adipic acid. The molar ratio of the carboxyl groups of adipic acid to the reactive groups of the crosslinkable polymer was adjusted to be 0.5.

The mixed solution of the crosslinkable polymer and adipic acid was applied to a release paper by a wire bar (#3) and heated at 50° C. to evaporate ethyl acetate and ethanol to form a crosslinkable polymer C/adipic acid layer on the release paper. The release paper was laminated on both surfaces of a porous substrate film made of polyethylene (having a thickness of 16 μm, a porosity of 40%, an air permeability of 300 s/100 cc, and a piercing strength of 3.0 N) in such a manner that the crosslinkable polymer C/adipic acid layer on the release paper was brought into contact with the film. The thus obtained laminate was passed through a hot roll at 70° C. and then the release papers were removed from the laminate to provide a crosslinkable polymer-supporting porous film which supported the crosslinkable polymer in an amount of 0.6 g/m² for each surface.

The above-mentioned crosslinkable polymer-supporting porous film was placed in a thermostat at 50° C. for 48 hours so that the crosslinkable polymer supported on the porous film was reacted with adipic acid and was partially crosslinked thereby to provide a reactive polymer-supporting porous film. The proportion of insoluble matter in the reactive polymer in the reactive polymer-supporting porous film was found to be 46%. The wettability of the reactive polymer-supporting porous film was found to be 10 second.

The negative electrode sheet obtained in the aforesaid Reference Example 1, the above-mentioned reactive polymer-supporting porous film, and positive electrode sheet obtained in the aforesaid Reference Example 1 were layered in this order to obtain a separator/electrode layered body. It was pressed with a pressure of 5 kgf/cm² at a temperature of 80° C. for 2 minutes to pressure-adhere and temporarily adhere the positive and negative electrode sheets to the reactive polymer-supporting porous film and obtain a negative electrode/porous film/positive electrode layered body.

The thus obtained separator/electrode layered body was placed in an aluminum laminate package and an electrolytic solution of lithium hexafluorophosphate in a concentration of 1.0 mol/L in a mixture of ethylene carbonate/diethyl carbonate (1/1 ratio by weight) was poured into the package and then the package was sealed. Thereafter the package was heated at 70° C. for 7 hours so that the reactive polymer was allowed to carry out cationic polymerization and crosslinked while a portion of the electrolytic solution was gelled thereby the porous film (separator) was bonded to the electrode sheets to provide a laminate battery.

The 1 CmA discharge capacity of the battery was found to be 87% of the discharge capacity of the reference battery. The battery was disassembled and the adhesion strength of the electrode sheets and the separator was measured to find that it was 0.12 N/cm for the positive electrode and 0.41 N/cm for the negative electrode. The surface thermal shrinkage ratio of the separator in the separator/electrode adherent obtained by using the above-mentioned reactive polymer-supporting porous film was found to be 1.5%.

Example 7

A reactive polymer-supporting porous film was obtained in the same manner as Example 5, except that the crosslinkable polymer D was used in place of the crosslinkable polymer C and the crosslinkable polymer-supporting porous film was placed in a thermostat at 50° C. for 60 hours. The molar ratio of the carboxyl groups of adipic acid to the reactive groups of the crosslinkable polymer was adjusted to be 0.5. The proportion of insoluble matter in the reactive polymer in the reactive polymer-supporting porous film was 65%. The wettability of the reactive polymer-supporting porous film was 10 second.

A laminate battery was obtained in the same manner as Example 1 by using the above-mentioned reactive polymer-supporting porous film. The 1 CmA discharge capacity of the battery was found to be 97% of the discharge capacity of the reference battery. The battery was disassembled and the adhesion strength of the electrode sheets and the separator was measured to find that it was 0.18 N/cm for the positive electrode and 0.20 N/cm for the negative electrode. The surface thermal shrinkage ratio of the separator in the separator/electrode adherent obtained by using the above-mentioned reactive polymer-supporting porous film was found to be 2.0%.

Example 8

Ethyl acetate was added to the ethyl acetate solution of the crosslinkable polymer E in a concentration of 33.3% by weight obtained in Production Example 5 to obtain a 10% by weight solution of the crosslinkable polymer E. A reactive polymer-supporting porous film was obtained in the same manner as Example 5, except that the ethyl acetate solution of the crosslinkable polymer E in a concentration of 10% by weight was used in place of the ethyl acetate solution of the crosslinkable polymer C in a concentration of 10% by weight and the crosslinkable polymer was applied to the substrate film made of polyethylene in an amount of 2.0 g/m² per one surface as well as the crosslinkable polymer-supporting porous film was placed in a thermostat at 50° C. for 160 hours.

The molar ratio of the carboxyl groups of adipic acid to the reactive groups of the crosslinkable polymer was adjusted to be 0.5. The proportion of insoluble matter in the reactive polymer in the reactive polymer-supporting porous film was 49%. The wettability of the reactive polymer-supporting porous film was 10 second.

A laminate battery was obtained in the same manner as Example 1 by using the above-mentioned reactive polymer-supporting porous film. The 1 CmA discharge capacity of the battery was found to be 92% of the discharge capacity of the reference battery. The battery was disassembled and the adhesion strength of the electrode sheets and the separator was measured to find that it was 0.09 N/cm for the positive electrode and 0.08 N/cm for the negative electrode. The surface thermal shrinkage ratio of the separator in the separator/electrode layered adherent obtained by using the above-mentioned reactive polymer-supporting porous film was 6.0%.

Example 9

The crosslinkable polymer D was dissolved in ethyl acetate at room temperature to obtain a solution of crosslinkable polymer D in a concentration of 10% by weight. Separately, an ethyl acetate solution of 10% by weight of 2,4-diethylglutaric acid was prepared. The ethyl acetate solution of 2,4-diethylglutaric acid was gradually dropwise added to the solution of crosslinkable polymer D while it was stirred to prepare a mixed solution of the crosslinkable polymer D and 2,4-diethylglutaric acid. The molar ratio of the carboxyl groups of 2,4-diethylglutaric acid to the reactive groups of the crosslinkable polymer was adjusted to be 0.2.

The mixed solution of the crosslinkable polymer D and 2,4-diethylglutaric acid was applied to a release paper by a wire bar (#7) and heated at 50° C. to evaporate ethyl acetate to form a crosslinkable polymer D/2,4-diethylglutaric acid layer on the release paper. The release paper was laminated on both surfaces of a porous substrate film made of polyethylene (having a thickness 16 μm, a porosity of 40%, an air permeability of 300 s/100 cc, a piercing strength of 3.0 N) in a manner that the crosslinkable polymer D/2,4-diethylglutaric acid layer on the release paper was brought into contact with the film.

The obtained laminate was passed through a hot roll at 70° C. and then the release papers were removed from the laminate to obtain a crosslinkable polymer-supporting porous film carrying the crosslinkable polymer in a coating ratio of 2.0 g/m² for each surface.

The crosslinkable polymer-supporting porous film was placed in a thermostat at 50° C. for 96 hours so that the crosslinkable polymer supported on the porous film was reacted with 2,4-diethylglutaric acid and partially crosslinked, thereby to obtain a reactive polymer-supporting porous film. The proportion of insoluble matter in the reactive polymer in the reactive polymer-supporting porous film was 41%. The wettability of the reactive polymer-supporting porous film was 10 second.

A laminate battery was obtained in the same manner as Example 1 using the above-mentioned reactive polymer-supporting porous film. The 1 CmA discharge capacity of the battery was 95% of the discharge capacity of the reference battery. The battery was disassembled and the adhesion strength of the electrode sheets and the separator was measured to find that it was 0.17 N/cm for the positive electrode and 0.15 N/cm for the negative electrode. The surface thermal shrinkage ratio of the separator in the separator/electrode adherent obtained by using the above-mentioned reactive polymer-supporting porous film was 4.0%.

Comparative Example 1

A 10% by weight polymer solution was prepared by dissolving poly(vinylidene fluoride/hexafluoropropylene) copolymer (KYNAR 2801, manufactured by Elf Atochem.) in N-methyl-2-pyrrolidone. The polymer solution was applied to both surfaces of a porous substrate film made of polyethylene (having a thickness of 16 μm, a porosity of 40%, an air permeability of 300 s/100 cc, a piercing strength of 3.0 N) by a wire bar (#20) and then heated at 60° C. to evaporate N-methyl-2-pyrrolidone to obtain a porous film made of polyethylene and carrying poly(vinylidene fluoride/hexafluoropropylene) copolymer on both surfaces. The wettability of the poly(vinylidene fluoride/hexafluoropropylene) copolymer-supporting porous film was 5 minutes.

The negative electrode sheet obtained in the aforesaid Reference Example 1, the porous film made of polyethylene and supporting the poly(vinylidene fluoride/hexafluoropropylene) copolymer obtained above and the positive electrode sheet obtained in the aforesaid Reference Example 1 were laminated in this order and bonded together under a pressure of 50 kgf/cm² at a temperature of 80° C. for one minute to obtain a separator/electrode layered body. The separator/electrode layered body was placed in an aluminum laminate package and an electrolytic solution obtained by dissolving 1.0 mol/L of lithium hexafluorophosphate in a mixed solvent of ethylene carbonate/diethyl carbonate (1/1 ratio by weight) was poured into the package and then the package was sealed to obtain a laminate battery.

The 1 CmA discharge capacity of the battery was 85% of the discharge capacity of the reference battery. The battery was disassembled and the adhesion strength of the electrode sheets and the separator was measured to find that it was 0.20 N/cm for the positive electrode and 0.09 N/cm for the negative electrode. The surface thermal shrinkage ratio of the separator in the separator/electrode layered adherent obtained by using the above-mentioned porous film supporting the poly(vinylidene fluoride/hexafluoropropylene) copolymer was 30%.

Comparative Example 2

A laminate battery was obtained in the same manner as Comparative Example 1, except that a solution of poly(vinylidene fluoride/hexafluoropropylene) copolymer in a concentration of 5% by weight was used. The 1 CmA discharge capacity of the battery was 96% of the discharge capacity of the reference battery. The battery was disassembled and the adhesion strength of the electrode sheets and the separator was measured to find that it was 0.05 N/cm for the positive electrode and 0.0 N/cm for the negative electrode. The wettability of the porous film supporting poly(vinylidene fluoride/hexafluoropropylene) copolymer obtained by this Comparative Example was 30 second and the surface thermal shrinkage ratio of the separator in the separator/electrode layered adherent obtained by using the above-mentioned porous film supporting poly(vinylidene fluoride/hexafluoropropylene) copolymer was 60%.

Accordingly, the use of a reactive polymer-supporting porous film of the invention makes it possible to obtain a battery in which electrodes are firmly bonded to a separator and the separator is scarcely shrunk even in the high temperature environments and which is thus excellent in the safety. Further, as it is clear in Examples 5 to 9, the reactive polymer-supporting porous films according to preferred embodiments of the invention are excellent in the wettability with an electrolytic solution and shorten the time required for producing batteries and increase the productivity of batteries.

The invention claimed is:
1. A method of producing a battery which comprises:
obtaining an electrode/reactive polymer-supporting porous film layered body by layering electrodes on a reactive polymer-supporting porous film, wherein the reactive polymer-supporting porous film comprises a porous substrate film and a reactive polymer partially crosslinked and supported on the porous substrate film, the reactive polymer being obtained by the reaction of a crosslinkable polymer having at least one reactive group selected from the group consisting of 3-oxetanyl group and epoxy group in the molecule with a polycarboxylic acid;

placing the electrode/reactive polymer-supporting porous film layered body in a battery container; and introducing an electrolytic solution containing a cationic polymerization catalyst into the battery container so that at least a portion of the reactive polymer is swelled or dissolved in the electrolytic solution at least in the vicinity of the interface of the porous film and the electrodes, and is cationic-polymerized thereby gelling at least a portion of the electrolytic solution so that the electrodes are bonded to the porous film.

2. The method of producing a battery according to claim 1, wherein the crosslinkable polymer is a radical copolymer of at least one radical polymerizable monomer selected from the group consisting of 3-oxetanyl group-containing radical polymerizable monomers and epoxy group-containing radical polymerizable monomers with another radical polymerizable monomer.

3. The method of producing a battery according to claim 1, wherein the crosslinkable polymer is a radical copolymer of 5 to 50% by weight of a 3-oxetanyl group-containing radical polymerizable monomer and/or an epoxy group-containing radical polymerizable monomer with 95 to 50% by weight of another radical polymerizable monomer.

4. The method of producing a battery according to claim 1, wherein the reactive polymer has insoluble matter in an amount of 1 to 90%.

5. The method of producing a battery according to claim 2, wherein the 3-oxetanyl group-containing radical polymerizable monomer is 3-oxetanyl group-containing (meth)acrylate represented by the general formula (I)

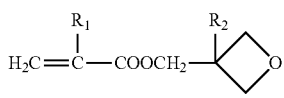

(I)

wherein $R_1$ is a hydrogen atom or a methyl and $R_2$ is a hydrogen atom or an alkyl group having 1 to 6 carbon atoms.

6. The method of producing a battery according to claim 2, wherein the epoxy group-containing radical polymerizable monomer is an epoxy group-containing (meth)acrylate represented by the general formula (II)

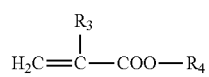

(II)

wherein $R_3$ is a hydrogen atom or a methyl group and $R_4$ is an epoxy group-containing group represented by the formula (1)

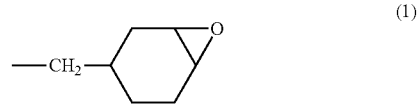

(1)

or (2)

(2)

7. The method of producing a battery according to claim 2, wherein said another radical polymerizable monomer is at least one selected from the group consisting of (meth)acrylates represented by the following general formula (III)

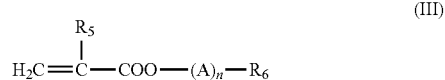

(III)

wherein $R_5$ is a hydrogen atom or a methyl group; A is an oxyalkylene group having 2 or 3 carbon atoms; $R_5$ is an alkyl group having 1 to 6 carbon atoms or a fluorinated alkyl group having 1 to 6 carbon atoms; and n is an integer of 0 to 3; and vinyl esters represented by the general formula (IV)

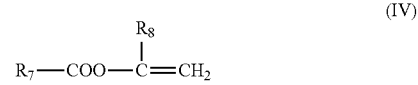

(IV)

wherein $R_7$ is a methyl or an ethyl group and $R_8$ is a hydrogen atom or a methyl group.

8. The method of producing a battery according to claim 1, wherein the crosslinkable polymer has a glass transition temperature of 70° C. or lower.

9. The method of producing a battery according to claim 1, wherein the porous substrate film has a thickness in a range of 3 to 50 μm and a porosity in a range of 20 to 95%.

10. The method of producing a battery according to claim 1, wherein the cationic polymerization catalyst is an onium salt.

11. The method of producing a battery according to claim 1, wherein the electrolytic solution contains at least one selected from the group consisting of lithium hexafluorophosphate and lithium tetrafluoroborate as an electrolytic salt working also as a cationic polymerization catalyst.

* * * * *